United States Patent
Baudart et al.

(10) Patent No.: US 10,150,421 B2
(45) Date of Patent: Dec. 11, 2018

(54) SLIDING CONSOLE, RANGE OF CONSOLES, CORRESPONDING MANUFACTURING PROCESS

(71) Applicant: FAURECIA INTERIEUR INDUSTRIE, Nanterre (FR)

(72) Inventors: Laurent Baudart, Fresnoy en Thelle (FR); Jean-Philippe Saulay, Louveciennes (FR)

(73) Assignee: Faurecia Interieur Industrie, Nanterre (FR)

( * ) Notice: Subject to any disclaimer, the term of this patent is extended or adjusted under 35 U.S.C. 154(b) by 19 days.

(21) Appl. No.: 15/365,363

(22) Filed: Nov. 30, 2016

(65) Prior Publication Data
US 2017/0151912 A1 Jun. 1, 2017

(30) Foreign Application Priority Data
Nov. 30, 2015 (FR) ...................... 15 61590

(51) Int. Cl.
*B60R 7/04* (2006.01)
*B60R 11/00* (2006.01)

(52) U.S. Cl.
CPC ............... *B60R 7/04* (2013.01); *B60R 11/00* (2013.01); *B60R 2011/0007* (2013.01); *B60Y 2410/12* (2013.01)

(58) Field of Classification Search
CPC ... B60R 7/04; B60R 11/00; B60R 2011/0007; B60Y 2410/12
USPC ...................................................... 296/24.34
See application file for complete search history.

(56) References Cited

U.S. PATENT DOCUMENTS

| 6,655,561 | B2 * | 12/2003 | Panhelleux | .......... | B60N 2/4646 |
|---|---|---|---|---|---|
| | | | | | 224/275 |
| 7,591,498 | B2 * | 9/2009 | Busha | ................. | B60N 2/4686 |
| | | | | | 224/281 |
| 2008/0252127 | A1 | 10/2008 | Kim | | |

FOREIGN PATENT DOCUMENTS

| EP | 1245447 A1 | 10/2002 |
|---|---|---|
| EP | 1982865 A2 | 4/2008 |

OTHER PUBLICATIONS

Preliminary Research Report in French for application No. FR1561590, dated Aug. 9, 2016, 2 pages.
Written Opinion for International application No. FR1561590, dated Aug. 9, 2016, 4 pages.

* cited by examiner

*Primary Examiner* — Joseph D. Pape
*Assistant Examiner* — Dana D Ivey
(74) *Attorney, Agent, or Firm* — Reising Ethington P.C.

(57) ABSTRACT

A sliding console that includes a stationary support, a moving console body, and a connecting device connecting two longitudinal guideways each having a rail and a slide. The sliding connecting device has two moving supports transversely separated from one another and at least two reinforcements separate from one another and separate from the moving supports. The reinforcements are spaced longitudinally apart from one another and fasten the moving supports to one another. The console body is fastened to the reinforcements, with each rail being fastened to one of the moving supports, and the slides being fastened to the stationary support.

11 Claims, 2 Drawing Sheets

SLIDING CONSOLE, RANGE OF CONSOLES, CORRESPONDING MANUFACTURING PROCESS

TECHNICAL FIELD

The invention generally relates to sliding vehicle consoles. More specifically, according to a first aspect, the invention relates to a sliding vehicle console, of the type comprising: a stationary support intended to be fastened to a structure of the vehicle; a console body longitudinally movable relative to the stationary support; and a sliding connecting device connecting the console body to the stationary support, wherein the connecting device includes two longitudinal guideways each having a longitudinal rail and a slide engaged freely translating in the rail.

BACKGROUND

Such consoles are for example known from EP 1,245,447. This document describes a sliding connecting device including a support on which the rails are fastened. The console body is rigidly fastened to the support.

Automobile builders have growing requirements regarding the holding of the console body on the support, and the vibrational behavior of this connection. Furthermore, their requirements are also growing for the rigidity of the sliding console and the impact resistance.

These requirements are particularly difficult to satisfy with the console of EP 1,245,447, since the latter, at the end of travel, has a significant cantilever relative to the stationary support.

One possibility to improve the behavior of the sliding console of EP 1,245,447 is to increase the thickness of the support. However, this leads to a significant increase in the mass of this support.

SUMMARY

In this context, the invention seeks to provide a sliding console making it possible to meet builders' requirements, without increasing the mass.

To that end, the invention relates to a sliding console of the aforementioned type, characterized in that the sliding connecting device comprises two moving supports transversely separated from one another and at least two reinforcements separate from one another and separate from the moving supports, the reinforcements being spaced longitudinally apart from one another and fastening the moving supports to one another, the console body being fastened to the reinforcements, each rail being fastened to one of the moving supports, the slides being fastened to the stationary support.

The moving supports and the reinforcements form a rigid chassis, the weight of which is not excessive, since the moving supports are separated from one another and the reinforcements are separated from one another. This structure thus typically includes large recesses, which contribute to reducing its total weight.

Furthermore, because the moving supports and the reinforcements are separate parts, independent of one another, the materials and thicknesses may be chosen so as to comply exactly with the requirements of automobile builders.

The support of EP 1,245,447 is for example obtained by extrusion. It is not possible to produce a local increase in thickness in such a support, so as to reinforce only one zone of that part. On the contrary, in the embodiments of the invention described herein, it is possible to reinforce only certain parts of the structure.

The number of reinforcements may be chosen based on the requirements to be met. If the weight of the console body is low, it is possible to provide only a small number of reinforcements, for example two reinforcements. On the contrary, if the weight of the console body is higher, it is possible to provide three reinforcements or more than three reinforcements.

Thus, the mass of the structure is still minimal.

The console may further have one or more of the features below, considered individually or according to any technical possible combination(s):

the moving supports are longitudinal metal profiles;

each reinforcement is a transversely elongated metal part, having two transverse end parts opposite one another each fastened to a moving support;

each reinforcement is cradle-shaped, the end parts protruding relative to a central part of the reinforcements;

the sliding connecting device comprises at least one cover, respective longitudinal ends opposite moving supports being fastened to one another by said cover;

each cover is a metal plate including a central zone substantially perpendicular to the longitudinal direction, and an edge bent relative to the central zone and extending over at least part of the periphery of the central zone, notches being cut into the bent edge to impart a transverse flexibility to the cover; and the reinforcements and the moving supports are fastened to one another by a method not using a heat contribution.

According to a second aspect, the invention pertains to a range of consoles having the above features, the range comprising:

at least a first console, including moving supports and a first number of reinforcements;

at least a second console, with different dimensions from the first console, including moving supports and a second number of reinforcements;

the reinforcements of the first and second consoles being identical.

The console range may further have one or more of the features below, considered individually or in combination:

the moving supports are identical;

the first number and the second number of reinforcements are different.

According to a third aspect, the invention relates to a method for manufacturing the above line of consoles, comprising the following steps:

manufacturing a plurality of moving supports;

manufacturing a plurality of reinforcements that are all identical;

manufacturing said at least one first console and said at least one second console from moving supports and reinforcements manufactured beforehand.

BRIEF DESCRIPTION OF THE DRAWINGS

Other features and advantages of the invention will emerge from the following detailed description, provided for information and non-limitingly, in reference to the appended figures, in which.

DETAILED DESCRIPTION OF THE ILLUSTRATED EMBODIMENTS

Figure 1:
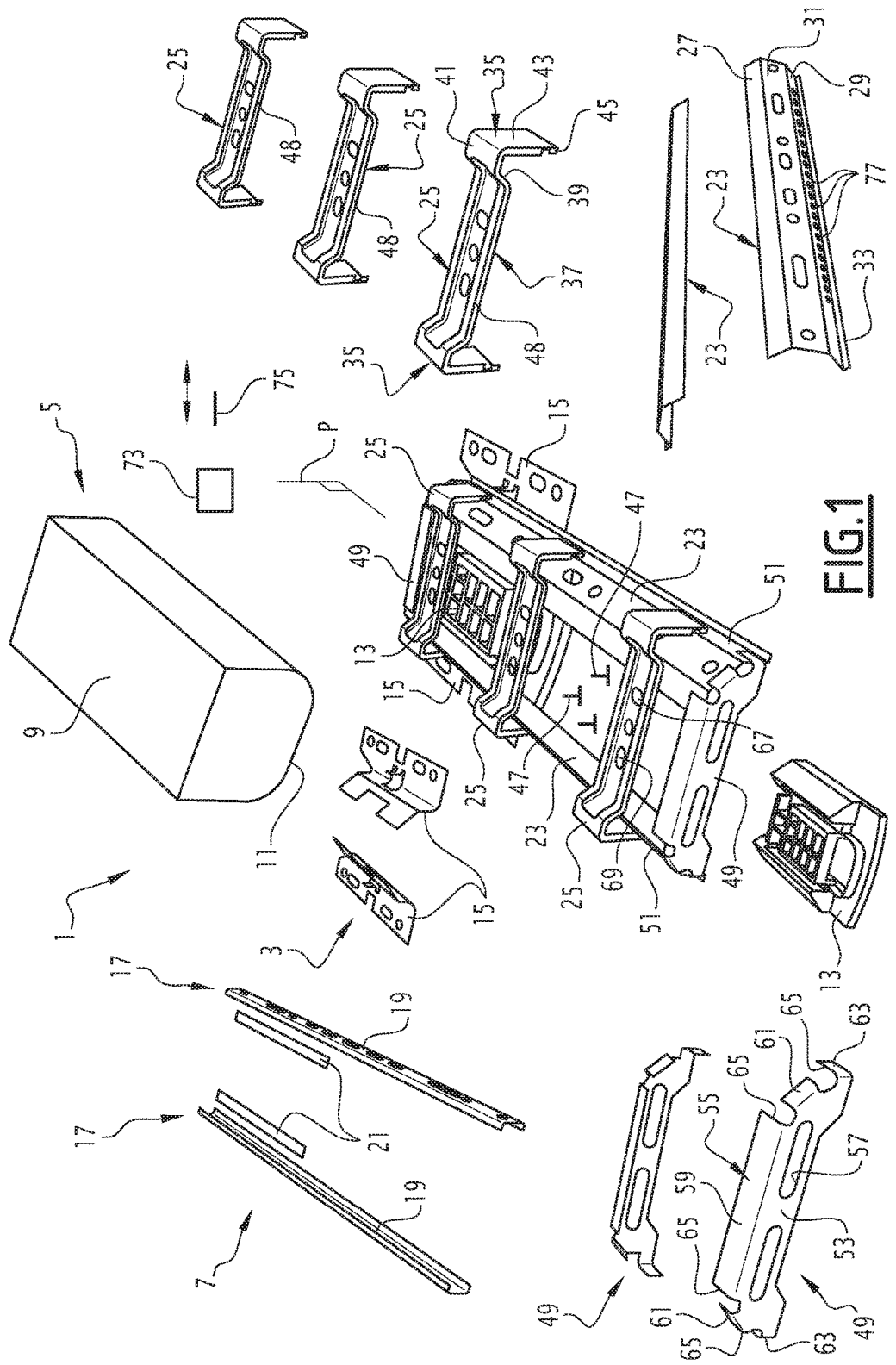
FIG. 1 is a perspective view of a sliding console according to the invention, in the exploded and partially assembled state.

The sliding console shown in FIG. 1 is intended to be installed in a motor vehicle, typically in a car or truck.

Typically, such a sliding console 1 is placed between the front seats of the vehicle. Alternatively, it is placed between the seats in the second row, or third row, or any other location of the vehicle.

The sliding console 1 comprises:
a stationary support 3 intended to be fastened to a structure of the vehicle;
a console body 5 longitudinally movable relative to the stationary support 3;
a sliding connecting device 7 connecting the console body 5 to the stationary support 3.

The longitudinal direction typically corresponds to the normal movement direction of the vehicle. Alternatively, this direction is perpendicular to the normal movement direction of the vehicle, or has any other orientation relative to the normal movement direction of the vehicle. The transverse direction is perpendicular to the longitudinal direction. The longitudinal and transverse directions together define a plane substantially parallel to the floor of the vehicle.

The stationary support 3 is typically intended to be fastened to the floor of the vehicle, or to any other suitable structure.

The console body 5 for example includes a hollow enclosure, inwardly defining a storage space for small accessories. It is for example upwardly closed by a moving cover, which can be used as an armrest for passengers. It is defined toward the floor of the vehicle by a bottom 11.

Alternatively, the console body is not used for storage or as a parcel tray, but for any other function such as CD or DVD player, refrigerated beverage storage, power outlet or USB plug support, etc.

In the illustrated example, the stationary support 3 includes a motor support 13 and two tabs 15. The tabs 15 are arranged transversely on either side of the motor support 13. Each tab 15 is rigidly fastened to the structure of the vehicle. The support 13 is rigidly fastened to the tabs 15.

The connecting device 7 includes two longitudinal guideways 17 each having a longitudinal rail 19 and a slide 21 engaged freely translating in the rail 19.

Each slide 21 has, longitudinally, a significantly shorter length than that of the rail 19. The travel of each slide 21 in the rail 19 is for example 30 mm.

The connecting device 7 further includes two moving supports 23 transversely separated from one another, and at least two reinforcements 25 separate from one another and separate from the moving supports 23, spaced longitudinally apart from one another and fastening the moving supports 23 to one another.

Figure 2:
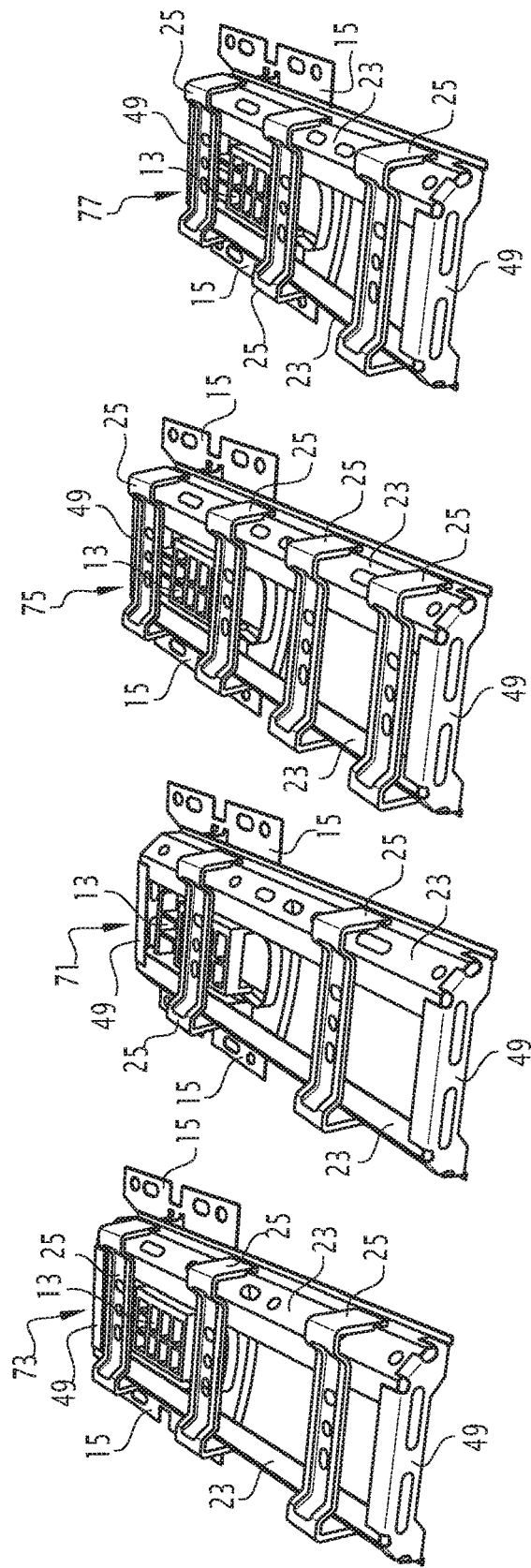
FIG. 2 shows lines of sliding consoles according to the invention.

In the example shown in FIG. 1, the connecting device 7 includes three reinforcements 25. Alternatively, as shown in FIG. 2, the connecting device includes only two reinforcements 25, or four reinforcements 25, and may also include more than four reinforcements 25.

The moving supports 23 are transversely separated from one another in that a continuous free space exists between the moving supports 23. Thus, the moving supports 23 typically never touch and do not overlap. The moving supports 23 are not integral with one another and have no direct connection to one another.

Typically, the moving supports 23 are longitudinal metal profiles. They are typically obtained by stamping or extrusion.

The moving supports 23 are for example both symmetrical relative to a longitudinal median plane substantially perpendicular to the plane defined by the guideways 17. This plane P is shown in FIG. 1.

The two moving supports 23 are typically identical to one another.

In the illustrated example, each moving support 23 upwardly includes a flat upper segment 27. The flat segment 27 is parallel to the plane defined by the guideways. Each moving support further includes, below the upper segment 27, a vertical segment 29, substantially parallel to the median plane P.

The segments 27 and 29 are connected to each other by an oblique segment 31.

Opposite the segment 31, the vertical segment 29 is defined by a bent edge 33, substantially parallel to the upper segment 27 and pointing in a direction opposite the segment 27.

The moving support 23 therefore has a generally concave shape toward the floor of the vehicle and toward the other moving support 23.

The segments 27, 29, 31 and the bent edge 33 extend longitudinally over the entire length of the moving support.

The rails 19 are each fastened on a moving support 23. Typically, the rails 19 have a first longitudinal length, the moving supports 23 having a second longitudinal length comprised between the first longitudinal length and the first longitudinal length+20%. For example, the second longitudinal length is equal to the first longitudinal length plus 10 mm. The slides 21 are typically rigidly fastened to the tabs 15 or to the motor support 13.

The reinforcements 25 are all identical to one another. Typically, these are metal parts, obtained by stamping.

Each reinforcement 25 has a transversely elongated shape. The reinforcements 25 are completely independent parts from one another, without a direct connection to one another. They are not integral with one another. Each reinforcement 25 has two transverse end parts 35 opposite one another, each fastened to one of the moving supports 23.

As shown in FIG. 1, each reinforcement 25 is preferably cradle-shaped, the end parts 35 protruding relative to a central part 37 of the reinforcement. The end parts 35 protrude upward, i.e., opposite the floor of the vehicle.

Typically, the central part 37 is substantially planar and parallel to the plane defined by the guideways. Each end part 35 transversely extends the central part and includes, from the central part 37, a first short arm 39, a flat apex 41, then a second long arm 43. The short arm 39 extends, from the central part 37, upward and transversely in a direction opposite the other end part 35.

The flat apex 41 is substantially parallel to the plane defined by the guideways. The long arm 43 extends, from the flat apex 41, downward, i.e., toward the floor, and transversely in a direction opposite the other end part 35.

As shown in the figures, considered parallel to the plane P, the long arm 43 has a greater length than the short arm 39. Thus, it has a free end situated below the central part 37, i.e., closer to the floor than the central part 37.

The reinforcements 25 are typically regularly distributed longitudinally, along the moving supports 23. They are arranged longitudinally at a distance from the ends of the moving supports 23, as shown by the figures.

Each reinforcement 25 is arranged such that the central segment 37 rests on the upper segments 27 of the moving supports. More specifically, opposite ends of the central part 37 are bearing on the upper segments 27. Furthermore, the long arms 43 are placed against the vertical segments 29.

The reinforcements 25 and the moving supports 23 are fastened to one another by a method not using a heat contribution, so as not to deform the reinforcements or the moving supports during this fastening. Thus, the reinforcements and the moving supports are preferably fastened to one another by clinching. Clinching is a fastening operation in which the material making up the moving support is pushed to the inside of an orifice arranged in the reinforcement. This material forms a collar surrounding the orifice on a side opposite the moving support. Alternatively, the material making up the reinforcement is pushed to the inside of an orifice arranged in the moving support.

For example, each reinforcement 25 is fastened at several points to the moving support 23: at the two elongate arms 43 and at the two opposite ends of the central part 37. The central part 37 is fastened to the upper segments 27, and the arms 43 to the vertical segments 29.

It should be noted that, in order to increase the rigidity of the reinforcements 25, bent edges 48 are provided both along the central part 37 and along the end part 35, over all or part of the periphery of the reinforcement.

The console body 5 is fastened directly to the reinforcements 25, and more specifically to the central part 37 of each reinforcement 25. It is fastened to each reinforcement 25 by mechanical fastening members 47, elongated in a direction perpendicular to the plane defined by the guideways.

These fastening members 47 are typically screws. They cooperate with the bottom 11 of the console body 5. Such an arrangement is particularly favorable to the rigidity of the fastening of the console body 5 to the sliding connecting device 7.

Furthermore, the sliding connecting device 7 preferably includes at least one cover 49, respective longitudinal ends 51 opposite moving supports 23 being fastened to one another by said cover 49.

Preferably, the connecting device 7 includes two covers 49. One of the covers 49 rigidly fastens first ends 51 opposite moving supports 23 to one another, and the other cover 49 fastens second longitudinal ends 51 opposite moving supports 23 to one another. The second ends are opposite the first ends.

The covers 49 make it possible to rigidify the ends of the structure supporting the console body 5, and to maintain the overall geometry.

The two covers 49 are preferably identical.

Each cover 49 is typically a metal plate obtained by stamping.

As shown in the figures, each cover 49 typically includes a central zone 53 substantially perpendicular to the longitudinal direction, and a bent edge 55 relative to the central zone 51. The bent edge 55 extends over all or part of the periphery of the central zone 53.

The central zone 53 has a transversely elongate shape, and may include recesses 57 so as to lighten the structure. The bent edge 55 includes a central segment 59 rigidly fastened to the upper segments 27 of the two moving supports 23.

The bent edge 55 also includes two first side segments 61 rigidly fastened to the inclined segments 31 of the two moving supports. It also includes two second side segments 63 rigidly fastened to the two vertical segments 29 of the moving supports.

Typically, notches 65 are cut into the bent edge 55 to impart a transverse flexibility to the cover 49. Advantageously, a notch 65 is provided between the central segment 59 and each first side segment 61, and another between each segment 61 and the adjacent second side segment 63. Conversely, the central segment 59 is continuous and does not include any notches 65.

Advantageously, the reinforcements 25 are provided to allow the isostatic fastening of the console body 5.

Thus, the transverse position of the console body 5 relative to the stationary support 3 is determined by an oblong hole 67, longitudinally elongated and arranged in the central part 37 of the reinforcement. The oblong hole 67 is provided to receive fastening members 47.

The position of the console 5 in the longitudinal direction is determined by another oblong hole 69, longitudinally elongated along the transverse direction, and arranged in the central part 37 of the reinforcement. One of the fastening members 47 is engaged in the orifice 69.

The position of the console body along the vertical direction, i.e., perpendicular to the plane defined by the guideways 17, is defined by the plane defined by the surface passing through the flat apices 41.

Preferably, the sliding connecting device includes a motor 73 provided to move a blocking finger 75 transversely via a kinetic chain, not shown.

Furthermore, at least one of the moving supports 23 has a plurality of blocking orifices 77, aligned longitudinally and distributed over the entire longitudinal length of the moving support 23. These orifices are for example arranged on the vertical segment 29.

The motor 73 is provided to move the finger 75 selectively between a position blocking the console in the current position, and a released position in which the console body 5 is longitudinally free relative to the stationary support. In the blocking position, the finger 75 is engaged in one of the orifices 77. In the released position, the finger 75 is removed from the orifice 77. It is thus possible to move the console body 5, with the moving supports 23 and the reinforcements 25, longitudinally relative to the stationary support 3. The motor 73 is controlled by a control member, not shown, able to be actuated by the passengers of the vehicle.

The number of reinforcements 25 is determined by the longitudinal length of the console, but also by the rigidity of the connection to be obtained with the console body.

The fact that the structure supporting the console body is made in several independent parts makes it possible to choose the desired thickness for each part.

In return, it is necessary for the manufacture of the sliding console to have several stamping tools, typically a stamping tool for the reinforcements, a stamping tool for the moving supports and a stamping tool for the covers. However, these stamping tools are simple, since the parts to be manufactured are small, and have simple shapes.

Furthermore, it will be noted that the sliding console includes several sets of identical parts: two moving supports 23 with the same shape, several reinforcements 25 with the same shape, two tabs 15 with the same shape and two covers 49 with the same shape.

This makes it possible to reduce the manufacturing costs.

According to a second aspect, particularly shown in FIG. 2, the invention makes it possible to produce a range of consoles with different dimensions.

This range comprises:

at least a first console 71, including moving supports 23 and a first number of reinforcements 25;

at least a second console, with different dimensions from the first console 71, including moving supports 23 and a second number of reinforcements 25.

The reinforcements 25 of the first and second consoles are identical.

Different dimensions here means:

that the length and/or the height of the console body 5 of the second console are different from those of the console body 5 of the first console 71, or that the console bodies 5 of the first and second consoles are identical, but the moving supports 23 of the first and second consoles have different dimensions.

According to a first example embodiment, the second console is the console referenced 73 in FIG. 2. The first number of reinforcements is different from the second number of reinforcements. Conversely, the moving supports 23 of the first and second consoles 71, 73 are identical.

Typically, all of the parts of the first and second consoles 71, 73 are identical to one another.

For example, the range of consoles further includes at least a third console 75, with a third number of reinforcements 25 different from the first and second numbers, or even with other consoles with another different number of reinforcements.

For example, the first console 71 includes two reinforcements 25, the second console 73 includes three reinforcements 25 and the third console 75 includes four reinforcements 25, as illustrated in FIG. 2.

According to a second example embodiment, the second console is the console 77 shown in FIG. 2.

The first console 71 includes moving supports 23 having a first length.

The second console 77 includes moving supports 23 having a second length, different from the first length.

The moving supports of the first and second consoles 71, 77 advantageously differ only by their longitudinal length. The first and second consoles 71, 77 also include the same parts.

The range of consoles alternatively includes at least a third console, which only differs from the first and second consoles because the moving supports have a third length different from the first and second lengths, and even still other consoles with moving supports having still other lengths.

The first and second consoles 71, 77 include the same number of reinforcements 25 or include a different number of reinforcements 25 from one another.

The range of consoles according to a third example embodiment includes, aside from the first console 71, one or several second consoles of the type of the console 73, and one or several second consoles of the type of the console 77.

The method for manufacturing the range of consoles comprises the following steps:

manufacturing a plurality of moving supports 23;

manufacturing a plurality of reinforcements 25 that are all identical;

manufacturing said at least one first console 71 and said at least one second console 73, 77 from moving supports 23 and reinforcements 25 manufactured beforehand.

Preferably, a large number of first consoles 71 and a large number of second consoles 73, 77 are manufactured.

For the range according to the first example embodiment, the moving supports 23 are all identical.

Alternatively, the manufacturing method includes a step for manufacturing other consoles from moving supports 23 that are all identical and reinforcements 25 that are manufactured beforehand, these other consoles have other numbers of reinforcements 25.

For the range according to the second example embodiment, a plurality of moving supports 23 with a first length and a plurality of moving supports 23 with a second length are manufactured.

The first consoles 71 are made from moving supports 23 having a first length.

The second consoles 77 are made from moving supports 23 having a second length.

Alternatively, the method includes a step for manufacturing other moving supports having other lengths, and a step for manufacturing other consoles from said other moving supports and pre-manufactured reinforcements.

It is thus possible, with the same elements or practically the same elements, to form consoles adapted to different types of vehicles.

The invention claimed is:

1. A sliding vehicle console, the console comprising:
a stationary support intended to be fastened to a structure of the vehicle;
a console body longitudinally movable relative to the stationary support; and
a sliding connecting device connecting the console body to the stationary support, the connecting device comprising two longitudinal guideways each having a longitudinal rail and a slide engaged freely translating in the rail;
wherein the sliding connecting device comprises two moving supports transversely separated from one another and at least two reinforcements separate from one another and separate from the moving supports, the reinforcements being spaced longitudinally apart from one another and fastening the moving supports to one another, the console body being fastened to the reinforcements, each rail being fastened to one of the moving supports, the slides being fastened to the stationary support.

2. The console according to claim 1, wherein the moving supports are longitudinal metal profiles.

3. The console according to claim 1, wherein each reinforcement is a transversely elongated metal part, having two transverse end parts opposite one another each fastened to a moving support.

4. The console according to claim 3, wherein each reinforcement is cradle-shaped, the end parts protruding relative to a central part of the reinforcement.

5. The console according to claim 1, wherein the sliding connecting device comprises at least one cover and respective longitudinal ends located opposite the moving supports and being fastened to one another by said cover.

6. The console according to claim 5, wherein each cover is a metal plate including a central zone substantially perpendicular to the longitudinal direction, and an edge bent relative to the central zone and extending over at least part of the periphery of the central zone, notches being cut into the bent edge to impart a transverse flexibility to the cover.

7. The console according to claim 1, wherein the reinforcements and the moving supports are fastened to one another by a method not using a heat contribution.

8. A range of consoles according to claim 1, the range comprising:
at least a first console, including moving supports and a first number of reinforcements; and at least a second console, with different dimensions from the first console, including moving supports and a second number of reinforcements;

wherein the reinforcements of the first and second consoles are identical.

9. The range of consoles according to claim 8, wherein the moving supports are identical.

10. The range of consoles according to claim 8, wherein the first number and the second number of reinforcements are different.

11. A method for manufacturing a range of consoles according to claim 8, the method comprising the following steps:

manufacturing a plurality of moving supports;

manufacturing a plurality of reinforcements that are all identical; and manufacturing said at least one first console and said at least one second console from moving supports and reinforcements manufactured beforehand.

\* \* \* \* \*